(12) United States Patent
Brand et al.

(10) Patent No.: US 12,416,906 B2
(45) Date of Patent: Sep. 16, 2025

(54) MACHINE TOOL CONTROL AND METHOD FOR CHARACTERISTIC DIAGRAM-BASED ERROR COMPENSATION ON A MACHINE TOOL

(71) Applicant: DECKEL MAHO Seebach GmbH, Seebach (DE)

(72) Inventors: Matthias Brand, Seebach (DE); Ines Schmidt, Waltershausen (DE); Isabella Glöde, Wutha-Farnroda (DE); Ronny Danek, Eisenach (DE); Alexander Timme, Eisenach OT Neuenhof (DE)

(73) Assignee: DECKEL MAHO SEEBACH GMBH, Seebach (DE)

( * ) Notice: Subject to any disclaimer, the term of this patent is extended or adjusted under 35 U.S.C. 154(b) by 425 days.

(21) Appl. No.: 17/919,990

(22) PCT Filed: Apr. 20, 2021

(86) PCT No.: PCT/EP2021/060246
§ 371 (c)(1),
(2) Date: Oct. 19, 2022

(87) PCT Pub. No.: WO2021/214061
PCT Pub. Date: Oct. 28, 2021

(65) Prior Publication Data
US 2023/0152773 A1 May 18, 2023

(30) Foreign Application Priority Data
Apr. 21, 2020 (DE) .................... 10 2020 205 031.7

(51) Int. Cl.
*G05B 19/404* (2006.01)
(52) U.S. Cl.
CPC .. *G05B 19/404* (2013.01); *G05B 2219/39191* (2013.01)

(58) Field of Classification Search
CPC ........ G05B 19/404; G05B 2219/39191; G05B 2219/49194; G05B 2219/49206; G05B 2219/50074; G05B 2219/50146
See application file for complete search history.

(56) References Cited

U.S. PATENT DOCUMENTS

| 5,804,940 A | 9/1998 | Erkens et al. |
| 2003/0097194 A1 * | 5/2003 | Gade .................. G05B 13/026 700/52 |

(Continued)

FOREIGN PATENT DOCUMENTS

| DE | 102009020246 A1 | 11/2010 |
| DE | 102010003303 A1 | 9/2011 |

(Continued)

OTHER PUBLICATIONS

Steffen Ihlenfeld et al: "on the Selection and Assessment of Input Variables for the Characteristic Diagram Based Correction of Thermo Elastic Deformations in Machine Tools", Journal of Machine Engineering, Bd. 18, Nr. 4, Nov. 30, 2018, pp. 25-38, XP055652003, ISSN: 1895-7595, DOI: 10.5604/01.3001.0012.7630, Abb. 1 Abs. 2/3.

(Continued)

*Primary Examiner* — Tameem D Siddiquee
(74) *Attorney, Agent, or Firm* — Procopio, Cory, Hargreaves & Savitch LLP (57) ABSTRACT

The present invention relates to an apparatus and to a method for compensation of errors of a numerically controlled machine tool, which has at least one controllable machine axis for relative positioning of at least one workpiece relative to one or more machining devices. The method comprises detecting actual measured values of at least one input variable describing a state of the machine tool by means of sensors on the machine tool, providing at least one compensation parameter to be utilized by a control (Continued)

device of the machine tool on the control device of the machine tool and compensating errors on the machine tool on the basis of the compensation parameter provided to the control device. The compensation comprises the compensation of thermal errors, the compensation of geometric errors and the compensation of errors on the basis of the dynamics of the machine.

19 Claims, 2 Drawing Sheets

(56) References Cited

U.S. PATENT DOCUMENTS

| | | | | |
|---|---|---|---|---|
| 2007/0180962 A1* | 8/2007 | Bretschneider | ...... | G05B 19/404 82/1.11 |
| 2010/0152881 A1* | 6/2010 | Ou | ........ | G05B 19/404 700/174 |
| 2015/0370242 A1* | 12/2015 | Takeno | ........ | G05B 19/404 700/193 |
| 2018/0196405 A1* | 7/2018 | Maekawa | ...... | G05B 19/404 |
| 2019/0195626 A1 | 6/2019 | Islei et al. | | |
| 2022/0180502 A1* | 6/2022 | Irie | ........ | G01K 11/26 |

FOREIGN PATENT DOCUMENTS

| | | |
|---|---|---|
| DE | 102014202878 A1 | 8/2015 |
| EP | 1034388 B1 | 2/2002 |
| EP | 1967926 A1 | 9/2008 |
| JP | 2006-116663 A | 5/2006 |
| JP | 2020-059073 A | 4/2020 |
| WO | 2020/200485 A1 | 10/2020 |

OTHER PUBLICATIONS

Shen Y et al: "Mapping of probe pretravel in dimensional measurements using neural networks computational technique", Computers in Industry, Elsevier, Amsterdam, NL, Bd. 34, Nr. 3, Dec. 1, 1997, pp. 295-306, XP004103489, ISSN: 0166-3615, DOI: 10.1016/S0166-3615(97)00065-1 Abstract Abb. 6 Abs. 3-5.

German Patent and Trademark Office, Office Action, Application No. DE 10 2020 205 031.7, dated Feb. 5, 2021, in 18 pages.

Naumann, Christian et al., "Characteristic diagram based correction algorithms for the thermo-elastic deformation of machine tools", Procedia CIRP 41 (2016), pp. 801-805.

Office Action received in JP Application No. 2022-564031, dated Jan. 16, 2024, in 14 pages (with Translation).

Office Action received in EP 21720455.1, dated Mar. 31, 2025, in 22 pages (with translation).

Denkena, B. et al., "Hybrid Spindle—An approach for a milling machine tool spindle with extended working range for HSC and HPC", Procedia Manufacturing, vol. 24, Jul. 6, 2018, pp. 159-165, XP093262797,43rd ed., in.

Ihlenfeldt, Steffen et al: "on the Selection and Assessment of Input Variables for the Characteristic Diagram Based Correction of Thermo-Elastic Deformations in Machine Tools", Journal of Machine Engineering, vol. 18, No. 4,Nov. 30, 2018, pp. 25-38, XP055652003, ISSN: 1895-7595, DOI: 10.5604/01.3001.0012.7630, in 14 pages.

Shen, Y et al. "Mapping of probe pretravel in dimensional measurements using neural networks computational technique", Computers in Industry, Elsevier, Amsterdam, NL, vol. 34, No. 3, Dec. 1, 1997, pp. 295-306, XP004103489,ISSN: 0166-3615, DOI: 10.1016/S0166-3615(97)00065-1, in 12 pages.

Office Action received in CN 202180028081.4, dated Mar. 19, 2025, in 24 pages (with translation).

* cited by examiner

Characteristic diagram adjustment

Determining training data
For example, by means of a test program, a machine measurement, or an external workpiece measurement

→

Original characteristic diagram(s)
The characteristic diagram may be stored on an external PC or directly at the control.

→

Reading the training data and adjusting the characteristic diagram(s)
AI algorithm, e.g. neural network

→

Providing the adjusted characteristic diagram to the machine control

Characteristic diagram control

Reading out and determining parameters
In certain time intervals (cyclically): temperature, geometric deviations ...
In control real-time: position, velocity, power, rotational speed

→

Characteristic diagram(s)
Determination of the correction values in real time according to the determined parameters.
The characteristic diagram may be stored on an external PC or directly at the control.

→

Control
Passing the correction values (e.g., Δx, Δy, Δz) to the control of the machine.

MACHINE TOOL CONTROL AND METHOD FOR CHARACTERISTIC DIAGRAM-BASED ERROR COMPENSATION ON A MACHINE TOOL

CROSS-REFERENCE TO RELATED APPLICATIONS

This application is US National Stage of International Patent Application PCT/EP2021/060246, filed Apr. 20, 2021, which claims benefit of priority from German Patent Application 10 2020 205 031.7, filed Apr. 21, 2020, the contents of both of which are incorporated herein by reference.

The present invention relates to a method and a device for characteristic diagram-based error compensation on a machine tool. Furthermore, the present invention relates to a system including a machine tool, in particular an NC or CNC machine tool, with a machine control configured to compensate for errors based on a characteristic diagram-based compensation.

Deformations and structural as well as dynamic deviations of machine tools may have a decisive influence on machining accuracy. Various methods are known for compensating for deviations.

For example, DE 102014202878 A1 discloses a machine tool including a machine frame on which functional components are arranged that generate heat during operation, and cavity structures are provided to form a circulation circuit. A cooling medium is circulated within the machine frame in the cavities in order to bring about a temperature balance between the warm and cold regions of the machine tool.

In addition, position errors may be corrected with the help of the machine control. DE 102010003303 A1 relates to a method and a device for compensating for a temperature-dependent positional change on a machine tool with at least one linear axis. According to the present invention, at least one temperature value is acquired at a temperature measurement position of the linear axis of the machine tool, a temperature difference value between a reference temperature and the acquired temperature value is calculated, a compensation value is determined as a function of the temperature difference value, and a temperature-dependent position change, e.g. a temperature-dependent displacement of a tool or workpiece clamped on the machine tool or a component of the machine tool or a linear axis of the machine tool, is compensated for during control of the machine tool as a function of the compensation value determined.

With regard to the methods and devices described above for correcting positional changes on a machine tool, it is an object of the present invention to provide an improved device and an improved method for compensating for errors on a machine tool, by means of which the compensation can be accomplished more efficiently and accurately. In addition, it is an object to provide an improved machine control.

According to the invention, the objects of the present invention described above are achieved as described in the independent claims. Features of preferred embodiments of the present invention are described in the dependent claims.

According to an exemplary aspect, a method for compensating for errors in a numerically controlled machine tool is proposed, said machine tool having at least one controllable machine axis for positioning at least one workpiece relative to one or more machining devices. The method may comprise acquiring actual values (or current measurement values) of at least one input variable describing a state of the machine tool (in particular spindle position, machine frame temperature, clamping path monitoring of multi-jaw chucks, tool position, spindle speed) by means of sensors on the machine tool, providing at least one compensation parameter to be evaluated by a control device of the machine tool at the control device of the machine tool, and compensating for determined errors or deviations at the machine tool based on the compensation parameter provided to the control device. The step of providing the at least one compensation parameter may further comprise: providing one or preferably a plurality of characteristic diagrams (in particular original characteristic diagrams), each of which may describe a structural behavior of the machine tool and/or a geometric arrangement of machine parts of the machine tool as a function of the respective input variable; superimposing the diagrams to form a combined diagram; providing a global correction model configured to calculate the compensation parameters to be evaluated by the control device of the machine tool based on the provided combined characteristic diagram, the acquired actual measurement values and/or one or more control parameters of the control device and calculating the compensation parameters using the global correction model based on the provided single characteristic diagram and/or a combined characteristic diagram, the acquired actual measurement values and/or the control parameters and providing compensation parameters to be evaluated by the control device at the control device of the machine tool. Here, compensation parameters may be the difference between a required target state and a (measured or simulated) actual state. A compensation parameter may also indicate a difference between a current control parameter and an optimized control parameter, wherein the actual state of the machine tool may be adjusted/approximated to the target state using the optimized control parameter and the error of the machine tool may thus be reduced or eliminated. A very fast and efficient compensation of deviations on the machine tool is achieved by the characteristic diagram-based compensation according to the invention. The machining accuracy of the machine tool can thus be significantly improved while at the same time optimizing the computing capacity of the machine control.

The characteristic diagram-based compensation is particularly advantageously expanded to include volumetric compensation for errors such as geometric errors (regarding rotary axes and linear axes) and compensation for errors due to the dynamics of the machine. Therefore, a comprehensive compensation directly at the machine control based on one or more superimposed diagrams is proposed. A characteristic diagram-based correction of errors in the numerically controlled machine tool is thus achieved. The machining accuracy can therefore be significantly improved without significantly increasing the computing and communication load of the machine control.

In addition, error compensation may be performed directly at the machine control based on a combined characteristic diagram (i.e., a characteristic diagram-based correction of errors such as positioning errors on the machine tool), wherein the combined characteristic diagram may be integrated into the global correction model of the machine tool. Particularly preferably, the combined characteristic diagram may be adjusted at least once or several times using a neural network. This has the synergistic advantage that the compensation can be carried out efficiently and user-friendly as well as extremely quickly and accurately in real time on the machine tool control based on the characteristic diagram provided. The characteristic diagram may be created on the basis of an FE simulation combined with actual measurement values (i.e. combination of simulation results of the machine tool and actual measurement values in order to generate a corresponding characteristic diagram). Advantageously, the combined characteristic diagram may also be constantly optimized by a neural network. A method for compensating for errors in a numerically controlled machine tool may therefore further include the step of: adjusting the combined characteristic diagram using a computer-implemented neural network (artificial neural network).

The global correction model preferably includes at least one characteristic diagram for vibration compensation of the machine tool. The compensation parameters for reducing the vibrations are determined by the global correction model based on the provided combined characteristic diagram (which includes the characteristic diagram for vibration compensation) and the acquired actual measurement values. For vibration compensation, the determined errors at the machine tool are compensated for based on the compensation parameters provided to the control device. Particularly preferably, compensation parameters for noise and vibration compensation (error compensation) of the machine tool are determined. Here, the compensation parameters are used for influencing the errors at the machine tool directly and actively by correspondingly controlling the machine tool via the machine tool control. For this purpose, in addition to the corresponding control of the axes of the machine tool, active machine bearings and/or active absorbers are also provided, for example, to reduce vibrations caused by machining during workpiece machining. On numerically controlled machine tools, errors can thus be compensated for in an efficient manner so that the machining accuracy can be improved.

The characteristic diagrams provided may each describe a temperature behavior, a static displacement behavior and/or a dynamic displacement behavior of the individual or the plurality of machine parts of the machine tool. In particular, multi-dimensional characteristic diagrams are used, which are determined based on measurement values and interpolation.

The combined characteristic diagram may be provided by superimposing two or more characteristic diagrams. The characteristic diagrams may be selected from a group of diagrams, said group comprising three or more diagrams; these may, for example, describe the respective temperature behavior, the static displacement behavior and/or the dynamic displacement behavior of the individual or the plurality of machine parts of the machine tool. This superimposition of the characteristic diagrams makes it possible to provide a multi-dimensional characteristic diagram that allows for a comprehensive description of the machine tool. A characteristic diagram for compensating for geometric errors is advantageously superimposed with other characteristic diagrams such as temperature characteristic diagrams, power characteristic diagrams, speed characteristic diagrams in order to form a combined characteristic diagram.

The combined characteristic diagram may be generated by superimposing or combining two or more characteristic diagrams, as a result of which a multi-dimensional characteristic diagram space is spanned. The characteristic diagrams may describe the temperature behavior, the static displacement behavior and the dynamic displacement behavior of the individual machine part or the plurality of the machine parts of the machine tool.

In addition to temperature values, the input variables describing the state of the machine tool may also be position values and/or acceleration values and/or force values and/or torque values and/or strain values. In particular, humidity and dimensions and position values measured on the workpiece may also be included. It is further advantageously proposed to use external measuring machines which have traceability in terms of measurement technology in order to further improve the accuracy of the characteristic diagrams.

The input variables of the characteristic diagrams and of the combined characteristic diagram are preferably in the form of vector variables. The multi-dimensional characteristic diagram is preferably first determined in experiments and later integrated into the machine control. During operation, the multi-dimensional diagram may be dynamically adjusted. Individual parameters of the characteristic diagrams may also be subsequently integrated into the machine control in order to expand the combined characteristic diagram. The combined characteristic diagram is thus configured such that a subsequent expansion of the characteristic diagram is possible without great effort. When the diagram is expanded, new reference points may be added to the characteristic diagram for characteristic diagram adjustment.

In a particular development of the invention another reference point is preferably deleted before a new entry in order to always use the memory space reserved for the characteristic diagram as fully as possible and also to maintain the adjustability of the characteristic diagram after lengthy training. For this purpose, the reference point with the minimum information content may preferably be selected. The absolute value of the error that occurs when a reference point is omitted and its position is interpolated is a measure of the information content of this reference point.

The calculation of the compensation parameters and/or the compensation of errors based thereon may be performed at predetermined time intervals. The characteristic diagrams may each be provided based on the acquisition of a plurality of reference measurement values of the input variables and/or by evaluating a computer-implemented simulation model or by externally measuring a workpiece or tool.

The characteristic diagrams and/or the combined characteristic diagram may be adjusted based on the acquired actual measurement values and/or the control parameters. Particularly preferably, the characteristic diagram may be adjusted at least once using a neural network. This has the synergistic advantage that the compensation can be carried out efficiently and user-friendly as well as extremely quickly and accurately in real time at the machine tool control based on the characteristic diagram provided. Particularly advantageously, the characteristic diagram may be created on the basis of an FE simulation combined with actual measurement values (i.e. combination of simulation results of the machine tool and actual measurement values in order to generate a corresponding characteristic diagram). Advantageously, the combined characteristic diagram may also be constantly optimized by a neural network. The characteristic diagrams and/or the combined characteristic diagram may be adjusted based on the actual measurement values and/or the control parameter using a computer-implemented neural network or another AI algorithm. This special combination makes it possible to obtain a comprehensive characteristic diagram that is ideally suited for use with the global correction model so that extensive and very precise correction values can be output.

Adjusting the characteristic diagrams may also comprise: reading at least a part of the currently provided characteristic diagrams and/or a part of the currently provided combined characteristic diagram on the neural network or other AI algorithms; reading the actual measurement values and/or the control parameters into the neural network or other AI algorithms; determining an adjusted characteristic diagram and/or an adjusted combined characteristic diagram.

The adjustment of the characteristic diagrams and/or the combined characteristic diagram may be performed automatically at predetermined time intervals.

The at least one compensation parameter may be calculated using the global correction model on the basis of the adjusted characteristic diagram or a combined characteristic diagram.

The actual measurement values may be acquired with the workpiece inserted in the machine tool.

The adjustment of the combined characteristic diagram may also comprise: acquiring one or more geometric deviations between target geometries and measured actual geometries of a first workpiece machined by the machine tool, adjusting the characteristic diagrams and/or the combined characteristic diagram based on the acquired actual measurement values and/or the at least one control parameter and/or the acquired geometric deviation.

The actual geometry of the workpiece may be acquired by an optical and/or touching measuring device.

The compensation parameters may be calculated using the global correction model by interpolation in the combined characteristic diagram on the basis of the acquired actual measurement values and/or the control parameters.

In addition, an evaluating device may be provided which is configured to superimpose the characteristic diagrams to form the combined characteristic diagram and/or to provide the global correction model, to receive the recorded actual measurement values and/or the control parameters, to calculate the compensation parameters based on the received actual measurement values and/or the control parameter and to provide the calculated compensation parameters to the control device of the machine tool.

The evaluating device may be formed integrally as part of the control device. The characteristic diagram may preferably be recalculated directly at the control. Alternatively, the recalculation may be carried out in the cloud or on an external computer. The recalculated characteristic diagram may be exchanged at the control or several characteristic diagrams may be stored, which may then be selected accordingly.

A control system for compensating for errors in a machine tool may comprise: a control device of the machine tool, one or more sensors attached to the machine tool for acquiring actual measurement values of one or more input variables describing a state of the machine tool, wherein the control system may be configured to carry out a method of compensating for errors. The control system may be configured to correct errors on the machine tool in a control-integrated manner and in real time. Particularly preferably, intelligent sensors which not only collect data but are also able to interpret and communicate them are also provided as sensors. In addition, a machine tool which comprises the control system is proposed.

The global correction model may also include models based on physics that depict the elastic behavior of the machine tool including its structural variability. By using the combined characteristic diagram, it is also possible to efficiently determine the susceptibility of the correction to disturbances and the residual errors to be expected. The method according to the invention also allows for continuous calculation during and between the operations of the machine tool.

A method of operating a machine tool may include the compensation method, wherein the driving signals may be corrected, and wherein the at least one driving signal may be corrected by means of a characteristic curve or a characteristic diagram, with the characteristic curve or the characteristic diagram being determined for compensation on a test bench or in machining tests depending on operating points. It is advantageous when the at least one control signal is corrected using the characteristic diagram. In this way, the controlled correction of the driving signal can be implemented particularly efficiently.

In preferred exemplary embodiments, the neural network may control the characteristic diagram provided at the control device of the machine tool. Sensor values (e.g. position measurement values of a position measurement method carried out on the machine tool) from one or more sensors of the machine tool may be transferred to the neural network as input data for the neural network in order to adjust the characteristic diagram.

A measuring probe may be used as a position measurement method on the machine tool. In addition, electromagnetic measuring devices and/or optical measuring devices (e.g., laser measuring device, camera device) may be provided. In addition, FE models and simulations of the machine tool may particularly preferably be used to determine further position values.

Advantageously, the measuring device may be based on physical touch and/or be configured as an optical measuring device for detecting 1-dimensional, 2-dimensional and/or 3-dimensional structures and/or as an ultrasound-based measuring device and/or as a radar-based measuring device and/or as an RFID-based measuring device and/or as a micro-GPS-based measuring device. The structure of the machine tool and the workpiece may be acquired precisely using the measuring device mentioned above.

Further aspects and advantages thereof as well as advantages and more specific implementation options of the aspects and features described above are apparent from the following descriptions and explanations relating to the attached figures, which are not to be understood as restrictive in any way.

DETAILED DESCRIPTION

In the following, examples and exemplary embodiments of the present invention are described in detail with reference to the attached figures. Identical or similar elements in figures will be denoted by the same reference symbols. It is to be noted that the present invention is not restricted to the exemplary embodiments described below and implementation features thereof, but also includes modifications of the exemplary embodiments, in particular within the scope of the independent claims.

According to an exemplary embodiment of the invention, compensation for geometric, static, dynamic and thermal errors in a numerically controlled machine tool 100 is proposed on the basis of one or more superimposed characteristic diagrams. Accordingly, an adjustment of a characteristic diagram-based compensation by volumetric compensation of errors, such as geometric errors (regarding rotary axes and linear axes), and a compensation of errors due to the dynamics of the machine is proposed. Particularly advantageously, the control of all corrections in a single correction model, a so-called global correction model, is proposed. In this way, a precise characteristic diagram-based correction of errors in the numerically controlled machine tool which only requires reduced computing power is achieved. The machining accuracy can therefore be significantly improved without significantly increasing the computing and communication effort of the entire machine control.

Figure 1:
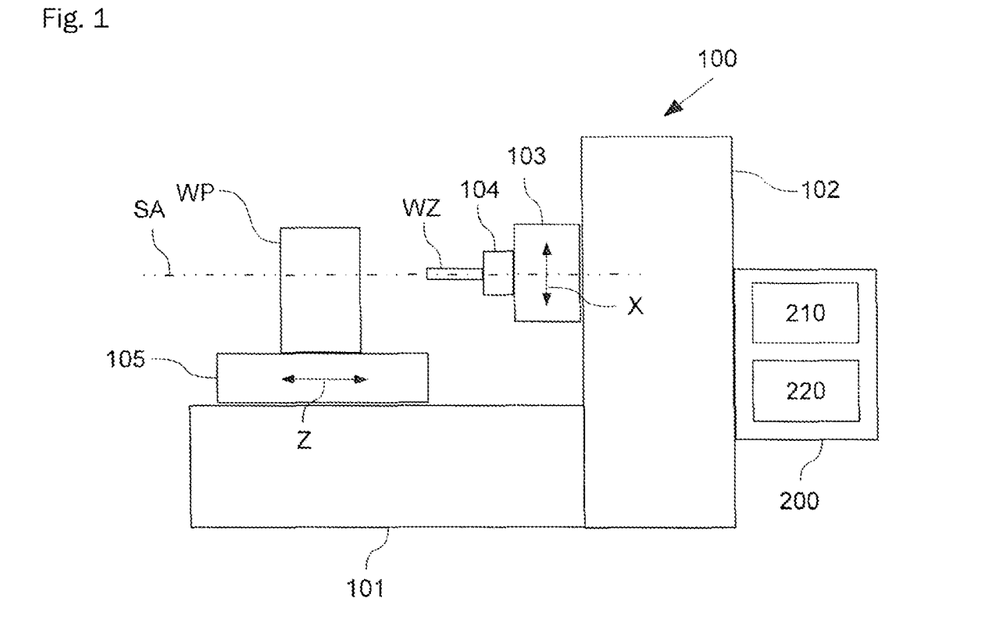
FIG. 1 shows an exemplary diagram of a numerically controlled machine tool 100.

A numerically controlled machine tool 100 having a machine control according to an exemplary embodiment of the present invention is shown as an example in FIG. 1. The machine tool is shown as a milling machine by way of example. However, the present invention is not restricted to milling machines, but may also be used on other machine tool types, e.g. in metal-cutting machine tools configured for workpiece machining, e.g. by drilling, milling, turning, grinding, such as milling machines, universal milling machines, lathes, turning centers, automatic lathes, milling/turning machines, machining centers, grinding machines, gear cutting machines, etc.

The machine tool 100 comprises, for example, a machine frame including a machine bed 101 and a machine stand 102. On the machine bed 101, for example, a movable machine sled 105 is arranged which is mounted, for example, such that it can be moved horizontally on the machine bed 101 in a Z direction (Z axis). For example, a workpiece WP is clamped on the machine sled 105, which may include a workpiece table, for example. For this purpose, clamping means may also be provided on the machine sled 105 or tool table. In addition, in further exemplary embodiments, the machine sled 105 may comprise a rotary table which can be rotated or pivoted about a vertical and/or further horizontal axis (optional rotary or rotational and/or pivot axis). Furthermore (or alternatively), the machine sled 105 can be moved in a horizontal Y direction (potentially perpendicular to the plane of the drawing) by means of a Y axis.

The machine stand 102 carries, for example, a spindle carrier sled 103 which can be moved vertically in an X-direction on the machine stand 102 and on which a work spindle 104 carrying a tool, for example, is held. The work spindle 104 is configured to drive the tool WZ (e.g. a drilling and/or milling tool) held on the work spindle 104 to rotate about the spindle axis SA. For example, the spindle carrier sled 103 may be moved vertically in the X direction by means of an X axis. Furthermore (or alternatively), the spindle carrier sled 103 may be moved in a horizontal Y direction (potentially perpendicular to the plane of the drawing) by means of a Y axis. In addition, in further exemplary embodiments, the spindle carrier carriage 103 may comprise a rotary and/or pivoting axis in order to rotate or pivot the spindle 104 (optional rotary or rotational and/or pivoting axis).

The machine tool 100 also includes, for example, a machine control 200 which, for operation by an operator of the machine tool 100, includes, for example, a screen 210 (e.g. configured as a touch screen) and an input unit 220. The input unit 220 may, for example, include means for user input or for receiving user commands from the operator, such as buttons, sliders, rotary controls, a keyboard, switches, a mouse, a trackball and possibly also one or more touch-sensitive surfaces (e.g. a touch screen, combinable with the screen 210). The operator may use the machine control 200 to control the operation of the machine tool or machine processes on the machine tool and also to monitor an operating state of the machine tool 100 or the machining process during machining. The machine control 200 includes, for example, an NC controller and a programmable logic controller (also SPS or PLC). In preferred exemplary embodiments, a monitoring device may also supply data read out or received by the machine control as input data to a neural network NN of the monitoring application, in particular periodically while the workpiece is machined. In preferred exemplary embodiments, the monitoring device is configured to output control data influencing the machining process to the machine control system when the machine tool 100 is in an abnormal operating state in order to carry out a process interruption, a drive stop, or a tool change.

The errors to be compensated for in the numerically controlled machine tool 100 are not limited to thermal positioning errors here, but rather include a large number of possible errors in the (entire) machine tool (i.e. the compensation according to the invention allows the compensation of global errors in the machine tool). The errors include, in particular, dynamically caused position deviations of moving machine parts of the machine tool, such as the spindle mount, tool slide, machine slide 105 and spindle carrier slide 103. In addition, the compensation according to the invention allows for active compensation of unwanted vibrations (also acoustic deviations) of the machine tool 100. The errors to be compensated for in the numerically controlled machine tool also include statically induced position deviations of machine parts of the machine tool, which result, for example, from the weight of the clamped workpiece or the changed weight distribution on the machine tool due to displaced machine parts. According to the invention, a characteristic diagram-based control is proposed, which is preferably integrated into an adaptive machine control. The compensation for geometric, static, dynamic and thermal errors in the numerically controlled machine tool 100 on the basis of one or more superimposed characteristic diagrams is proposed.

Figure 2:
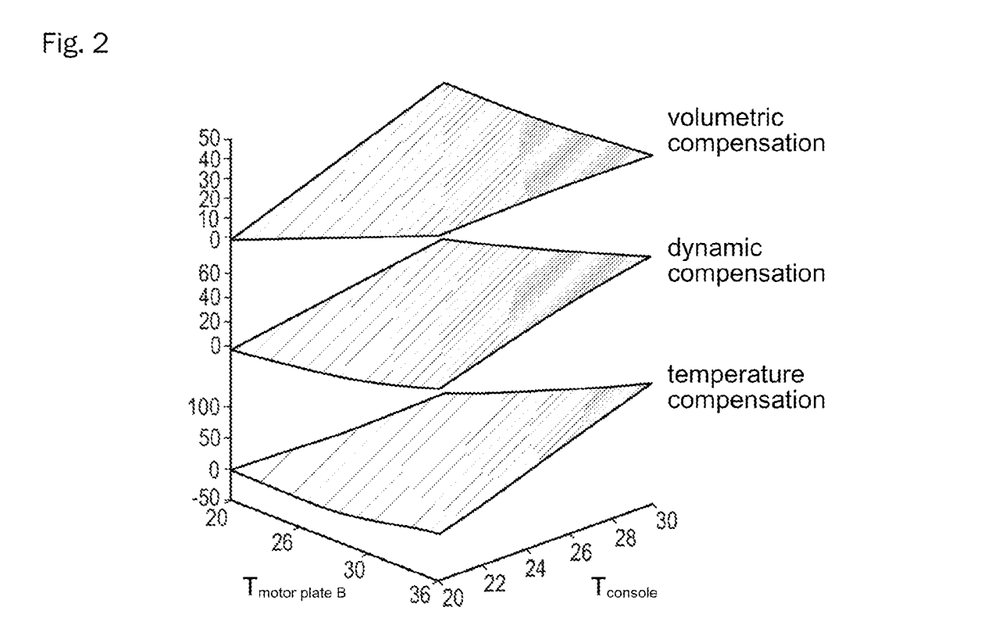
FIG. 2 illustrates characteristic diagrams for various compensations.

In FIG. 2, a plurality of characteristic diagrams are shown in simplified form by way of example. Here, different characteristic diagrams are provided for the compensation of different errors in the machine tool. For example, a corresponding characteristic diagram of the machine tool 100 (or the machine part of the machine tool) may be provided for the volumetric compensation of geometric errors (e.g. errors in linear and rotary axes). A corresponding characteristic diagram for the dynamic compensation may be provided for the compensation of errors due to the dynamics of the machine tool, such as pitch compensation. A corresponding characteristic diagram is also provided for the compensation of temperature-related errors in the machine tool, for example due to machining-related temperature increases or changes in the ambient temperature. Advantageously, these characteristic diagrams may also be merged to form a combined characteristic field. A characteristic diagram for compensating for geometric errors is thus advantageously superimposed with other characteristic diagrams such as temperature characteristic diagrams, power characteristic diagrams, velocity characteristic diagrams to form a combined characteristic diagram. Therefore, a control-independent and free correction of various error components of the machine tool can be achieved.

A characteristic diagram may represent a plurality of characteristic curves as a function of a plurality of input variables, for example in the form of a plurality of characteristic curves, or in a multi-dimensional coordinate system. The characteristic curve describes the behavior of the machine tool as a function of the input variables. Characteristic curves are used in practice, e.g. to determine the operating point, to determine a linear approximation at a specific point on the characteristic curve. Furthermore, they can be used to determine the power loss of a component or to correct the signal emitted by a sensor.

For characteristic diagram-based compensation, characteristic diagrams may be understood as continuous mappings of input variables to a one-dimensional or multi-dimensional displacement or to compensation parameters. The most important input variables are parameters present on the machine structure (e.g. recorded or measured by one or more sensors arranged at sensor positions of the machine structure, e.g. on the machine bed, on movable components of the machine tool, on rotatable or pivotable components of the machine tool, etc.) and position data of the machine axes. In addition to measurement values, the characteristic diagrams may be calculated or determined on the basis of a data processing process or a simulation on a virtual machine tool or on the basis of a digital twin of the machine tool and/or on the basis of experimental determinations on a machine tool in a test operation.

According to the invention, an integrated application of characteristic diagrams (or a combined multi-dimensional characteristic diagram) for compensating for systematic geometric errors in linear or rotary axes, for compensating for temperature-related errors, and for compensating for errors due to the dynamics of the machine, such as pitch compensation, is proposed. Correction terms, which were determined in advance using a large number of measuring points in the workspace and/or by computer simulation such as FEM or multi-body simulation, are output from the combined characteristic diagram of the machine control system. In other words, a characteristic diagram for compensating for geometric errors is superimposed with other characteristic diagrams such as temperature characteristic diagrams, power characteristic diagrams, velocity characteristic diagrams in order to form a combined characteristic diagram. Therefore, a control-independent and free correction of various error components of the machine tool can be achieved. In addition, the characteristic diagrams may preferably be supplemented by parameters which create the machine statics (geometric accuracy) and/or the dynamics (positioning accuracy). The characteristic diagrams may advantageously be corrected/optimized by determining deviations at the part (initial sample) using a measuring device (measuring machine) in order to adjust the characteristic diagrams precisely to the range of parts.

For example, the combined characteristic diagram may be represented by a number of reference points present in the machine memory. Using a superimposed control, the deviation of the diagram characteristic value read out for an operating point from an optimal target value is determined. The combined characteristic diagram may be incorporated into a global correction model in order to determine the compensation values. The global correction model according to the invention is configured to calculate the compensation parameters to be evaluated by the control device of the machine tool based on the characteristic diagram provided, the acquired actual measurement values and one or more control parameters of the control device.

Based on the global correction model, a multi-dimensional correction vector, for example for the change in position, may be output for correcting the errors (such as displacement correction). In contrast to conventional volumetric compensation, it is particularly advantageous for the compensation to be carried out using the global correction model exclusively based on the characteristic diagram provided. In this way, the computing time can be reduced and a quick and efficient compensation is achieved. In addition, control-independent and stable compensation is made possible.

In an advantageous further development according to an exemplary embodiment of the present invention, correction terms or one or more correction parameters for the control-internal compensation of the errors may be periodically are transferred from the global correction model to the machine control on the basis of the entered input variables, e.g. by evaluating the sensors and/or control-internal data, with the machine control then carrying out the error compensation using the transferred correction terms. For example, by adjusting target positions of the linear, rotary and/or pivoting axes of the machine tool on the basis of the transferred correction terms, it is possible to compensate for geometric or dynamic errors. The errors of the numerically controlled machine tool to be compensated are not limited to thermal positioning errors, but include a large number of errors such as geometric, dynamic and static errors of the machine tool (i.e. the compensation according to the invention allows for the compensation of global errors of the machine tool).

In order to optimize the characteristic diagram (original characteristic diagram) and/or the global correction model, a neural network structure which can update the characteristic diagram using new data is preferably implemented. The neural network may be provided externally by the machine control. However, the neural network structure is particularly advantageously integrated into the actual machine control.

New training or input data for the neural network may preferably be determined from the real process or during operation on the machine tool (e.g. in an experimental test operation and/or in the real machining process on the machine tool), and additionally or alternatively training or input data for the neural network may also be determined from a computer-implemented simulation of a machine tool, e.g. on a virtual machine tool and/or on the basis of a digital twin of the machine tool. Together with the existing data from an FE analysis, a computer simulation of a machine tool (virtual machine tool or digital twin) and/or experimental operation of a machine tool, new data optimizing the characteristic diagrams may be generated with the help of a neural network. This optimization is preferably carried out cyclically. A control-integrated solution for the self-monitoring machine tool is thus achieved.

For the adjustment of the characteristic diagram or characteristic diagrams by the neural network, the characteristic diagrams or entries in the characteristic diagrams may be transferred from the machine control to the neural network as input data of the neural network and the characteristic diagrams or at least parts thereof may be read into the neural network. In addition, new data or input variables may be read from the machine tool, from sensors in the machine tool and/or from the machine control of the machine tool. The characteristic diagrams are then preferably updated or adjusted on the basis of the network structure of the neural network and/or at least one or more entries in the characteristic diagram(s) are updated or adjusted. The network structure of the neural network may be based on radial basis functions and/or on interpolation functions (e.g. linear and non-linear regression methods). Continuously learning compensation algorithms according to exemplary embodiments are preferably based on neural networks and/or interpolation functions (e.g. linear and/or non-linear regression methods, radial basis functions, polynomial basis functions, etc.). In addition, genetic algorithms for the independent adaptation of the interpolation reference points for the interpolation functions may be incorporated. Therefore, a control-independent and free correction of various error components of the machine tool can be achieved.

Compensation parameters, which were determined in advance by sufficient measuring points in the operating space and preferably by computer simulation, are transferred from a characteristic diagram of the machine control or the global correction model. The characteristic diagram is preferably also updated or optimized over time in order to take account of changes in the machine tool over time (e.g. wear) in the characteristic diagram and thus also to compensate for changes in the geometry over time.

The compensation parameters are used to adjust one or more target positions in order to correct or compensate for geometrically, dynamically, statically and thermally induced position changes on the machine tool. Here, the respective compensation parameters may specify correction parameters that can be used for individual axes of the machine tool or also specify correction parameters in individual orthogonal directions.

In a further exemplary embodiment, a PLC real-time system may be provided, for example, which reads the input variables and outputs the output variables. An IPC system connected to the PLC system may also be provided for calculating an index. The IPC system is used to process the entered data in the form of an index, taking into account externally stored characteristic diagrams, in order to subsequently output the compensation parameters to the machine tool via the real-time system in accordance with the errors or deviations determined.

In a first step, the input variables are acquired, with measurement values describing the state of the machine tool being detected and read. A plurality of values, such as temperature values T1-T8, position values POS, etc., are read as input variables. In addition, further sensor values may be used as input variables, such as pressure measurement values (e.g. pressure measurement values in the hydraulic and/or pneumatic systems of the machine tool, pressure measurement values in the cooling circuit systems of the machine tool, etc.), oscillation or vibration measurement values (e.g. from vibration or oscillation sensors), force measurement values (e.g. from force sensors, strain gauge sensors, etc.), torque measurement values (e.g. from torque sensors or based on calculations based on force measurement values), active power values, acceleration measurement values (e.g. from acceleration sensors), structure-borne noise values (e.g. from structure-borne noise sensors), etc. The input variables are read in at least once when the process starts. In addition, reading may advantageously be carried out repeatedly at regular time intervals. Parameters taken from the machine control or determined or evaluated from the machine control may include, for example, target position values for axes of the machine tool, determined actual position values for axes of the machine tool, rotational speeds (e.g. spindle speeds), motor currents, motor power, etc.

Input variables read are subjected to a plausibility check in the real-time system in order to ensure robust processing of the data and, for example, to detect measurement errors at an early stage. In a further step, the compensation parameters are provided. Providing the compensation parameters includes reading the characteristic diagrams or combined characteristic diagram and superimposing the characteristic diagrams to form a combined characteristic diagram. A global correction model of the machine tool with which the compensation parameters are determined is created from the characteristic diagram. In particular, deviations of the input variables from ideal parameters of the characteristic diagrams are recorded. Correction parameters or compensation parameters are calculated based on the recorded difference. The compensation parameters may be applied to the control values of the machine tool via the machine control so that the errors in the machine tool are compensated for, e.g. by adjusting the target positions of one or more movable components of the machine tool (e.g. the linear, rotary and/or pivot axes of the machine tool) based on the transferred compensation parameters. For example, a position command may be compensated for by adding the compensation parameters of the offset to the position command. In addition, a change between the offset magnitude calculated last time and a current offset magnitude can be determined for each predetermined time.

According to some exemplary embodiments, a complete analysis of the machine tool in a data processing method or a computer-based simulation, starting from the analysis of one or more FE models of the machine or machine tool, may generate or calculate one or more characteristic diagrams which preferably describe(s) a temperature behavior of the machine or machine tool. In further exemplary embodiments—in addition or as an alternative to the calculation of one or more characteristic diagrams on the basis of an FEM-based simulation—characteristic diagrams may also be calculated, determined and/or adjusted based on a computer simulation of a machine tool (so-called virtual machine tool or so-called digital twin). In addition or as an alternative, characteristic diagrams may also be determined and/or adjusted on the basis of an experimental determination on a machine tool in test operation.

Figure 3:
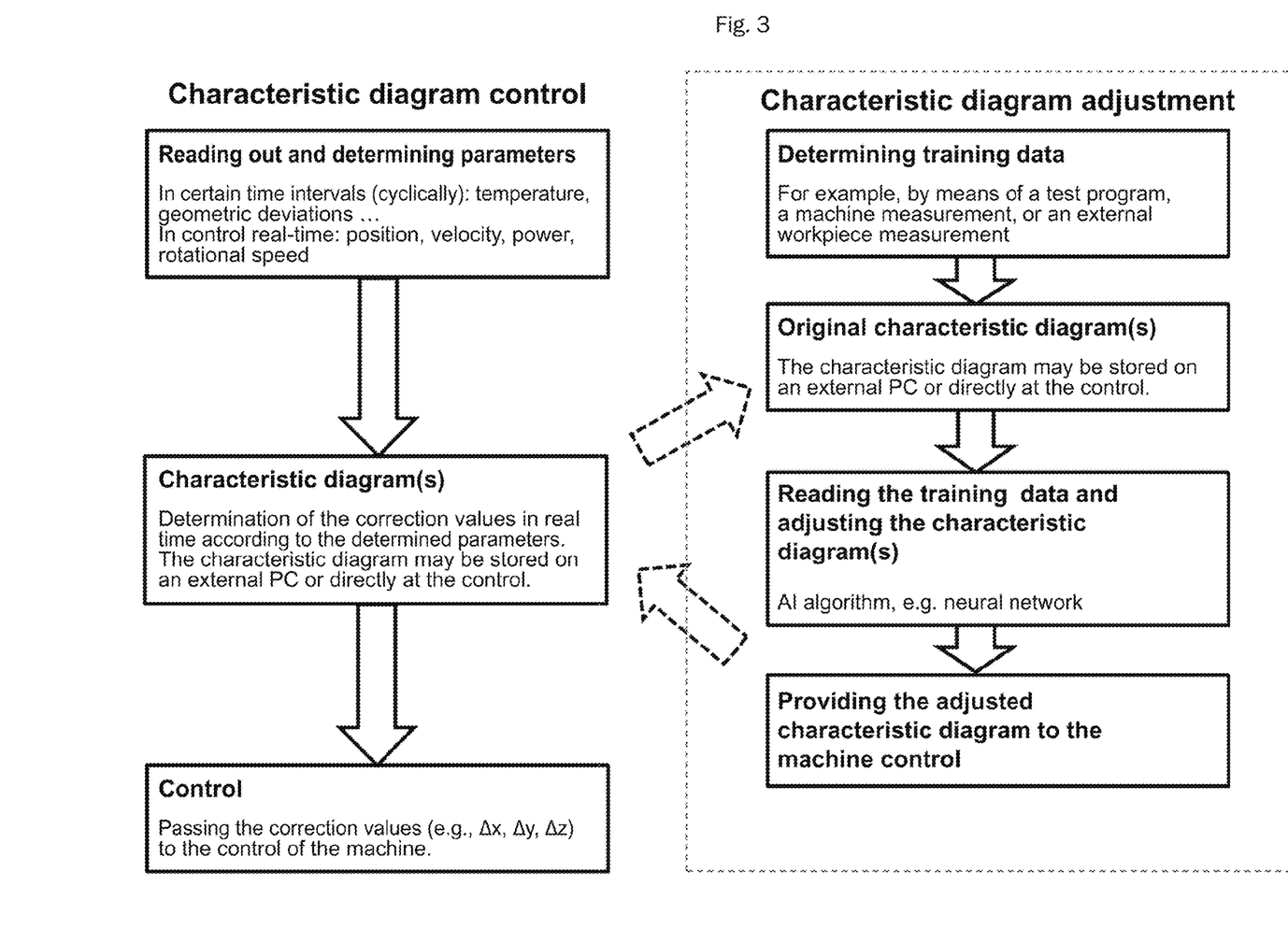
FIG. 3 illustrates the characteristic diagram control with characteristic diagram optimization.

FIG. 3 shows the use of a neural network for characteristic diagram optimization for the characteristic diagram-based method for error compensation on the machine tool.

In the first step, parameters are determined or read out. In particular, first parameters are determined and read cyclically at specific time intervals. These first parameters include, for example, the temperature and geometric and dynamic deviations. In addition, second parameters are determined and read. The second parameters are determined and/or read out in control real time. The second parameters include, for example, the position, velocity, power, rotational speed, etc. of the machine tool. In the first step, the input variables of the characteristic diagrams are read (e.g. from the machine control or by direct transmission of sensor values from sensors on the machine tool).

Preferably, some or all of the input variables of the characteristic diagram to be updated are read. It is also possible to read further input variables. Alternatively or additionally, sensor data may also be generated from a computer-implemented simulation of a machine tool (e.g. on a virtual machine tool or based on a digital twin of the machine tool), i.e. so-called synthetically generated sensor data. This preferably includes reading temperature measurement values from temperature sensors of the machine tool. In addition, this may include reading position data relating to the actual positions of moving components (e.g. movable axes) of the machine tool, e.g. from the machine control or from position measurement sensors of the machine tool. Furthermore, additional sensor data or control data may be read.

In the second step, the one or more characteristic diagrams are used. In particular, correction parameters are determined in real time according to the parameters determined in the first step. The at least one characteristic diagram may be stored on an external computer or directly at the control. The characteristic diagrams used include characteristic diagrams that describe a structural behavior (in particular a characteristic diagram for compensating for geometric errors), a dynamic behavior (velocity characteristic diagram), a power characteristic diagram and a temperature behavior of the machine tool (temperature characteristic diagram). The characteristic diagrams may have been generated on the basis of measurement values and an FE model-based simulation and are preferably provided as a stored data structure at the machine control (e.g. as a lookup table or lookup matrix). In addition to the characteristic diagrams mentioned, special characteristic workpiece-specific characteristic diagrams may advantageously be read. The workpiece-specific characteristic diagrams describe the machine behavior when machining a special predefined workpiece. The characteristic diagrams may also be combined to form a combined (multi-dimensional) characteristic diagram. This subsequently enables the provision of a global correction model, wherein all corrections can be mapped in one model. On the control side, this leads to greater accuracy with reduced computing power.

Advantageously, a specific temperature characteristic diagram, which specifies the temperature as a function of the measured input variables, is expanded by characteristic diagrams that are calculated virtually by model calculations. In addition, other measured and/or simulated characteristic diagrams such as characteristic diagrams for compensating for geometric errors, power characteristic diagrams, and velocity characteristic diagrams may be combined. By merging the characteristic diagrams (simulated and measured) into a combined characteristic diagram, the parameters contained in the virtual characteristic diagram may be adapted so that the global correction model of the machine tool, which contains the interactions of all incoming variables, enables purely theoretical predictions as well as statements that require only little experimental support.

Advantageously, the second step may also include a characteristic diagram adjustment, as shown in FIG. 3. First, training data for the diagram adjustment are determined. The training data may be determined, for example, by a test program, a machine measurement or an external workpiece measurement. The training data are read in order to train the neural network or an AI algorithm. Externally measured position data may be used to compare actual and target positions on the machine control with additional position measurement values. In addition, training data may also be provided from a computer-implemented simulation of the machine tool.

In the next step, the original characteristic diagram (characteristic diagram in the initial state before optimization) is loaded. The original characteristic diagram may be stored on an external computer or directly at the machine control. In the next step, the at least one (original) characteristic diagram may be adjusted. The diagram is adjusted or optimized using an AI algorithm or a neural network based on the training data and the previously determined parameters. In the last stage, the characteristic diagram (optimized characteristic diagram) of the machine control may be provided. The optimized characteristic diagrams are integrated into the global correction model, for example, and are thereby provided to the machine tool. The control device of the machine tool may calculate the compensation parameters to be used using the global correction model including optimized characteristic diagrams.

In the last step, the correction values are transferred to the machine control.

The global correction model may be used to describe and correct the structural, dynamic and thermal behavior of the entire machine tool. First of all, the current state of the machine tool may be determined on the basis of the current measurement values or input variables. For each state, there is a separate set of parameters which maps the characteristic diagram in which the parameters are stored as a function of the input variables u. The parameters are determined on the basis of the current input variable u(tn), for example by interpolation. Errors on the machine tool may then be compensated for based on the compensation parameters provided to the control device. For example, the displacement of, for example, the TCP (tool center point; operating point active point, tool reference tool operating point) may be determined at fixed or variable times using the global correction model. The calculated displacement may then be used as an offset. The global correction model may be a control loop and preferably include a black box model or a white box model of the machine tool. The global correction model may also include a chain of individual systems of the machine tool, the output variable of which is measured by a measuring element and fed back to the machine control system via a target/actual value comparison. The actuator as the interface between the machine control and the controlled system may be part of the controlled system.

Here, the global correction model is preferably integrated directly into the machine control so that deviations can be compensated for autonomously. Therefore, almost instantaneous compensation of errors is possible directly on the machine tool. With the compensation integrated into the control, it is also possible to predict displacements based on the global correction model, wherein certain input variables such as the rotational speed may be read directly from the NC code. The temperature behavior, the positions and the displacements may also be predicted within certain limits during operation of the machine tool, so that the compensation parameters can already be adapted to the errors to be expected in order to minimize the errors. If, however, further deviations are determined by evaluating the measurement values, the compensation parameters can be adjusted further. The machine tool errors that occur during the measuring time may also be anticipated using the global correction model so that the time-varying behavior of the machine tool is also taken into account. The coupling of the measurement/determination of the input variables and the processing of the values in the global correction model in an iterative process allows for an optimal overall minimization of the residual.

In a further development, it is proposed that the compensation parameters are generated and stored in association with system states of the machine tool acquired at the time the compensation parameters are generated. Upon recognizing appropriate system conditions at a later time, the machine tool control is able to use the previously generated and stored compensation parameters to adjust the timing of machine tool functions so that machine tool accuracy can be easily and efficiently improved.

In a particularly advantageous further development, special workpiece-specific characteristic diagrams are used in addition to the characteristic diagrams mentioned. The workpiece-specific characteristic diagrams describe the machine behavior when machining a special predefined workpiece. By integrating a workpiece-specific characteristic diagram into the combined characteristic diagram, the precision of the machine tool when machining the defined workpiece can be significantly improved since workpiece-specific deviations are already anticipated in the control. It is therefore also possible to predetermine these deviations or errors even before they actually occur and to initiate appropriate compensation via the machine control system even before the errors occur. Additional errors that occur during the machining process can be detected and compensated for in real time.

Examples or exemplary embodiments of the present invention and advantages thereof have been described in detail above with reference to the attached figures. It should be noted again that the present invention is in no way limited or restricted to the exemplary embodiments described above and implementation features thereof but also includes modifications of the exemplary embodiments, in particular those that are included in the scope of the independent claims by modifying the features of the examples described or by combining one or more of the features of the described examples.

The invention claimed is:

1. A method for compensating for errors in a numerically controlled machine tool, which includes at least one controllable machine axis for positioning at least one workpiece relative to one or more machining devices, said method comprising:
acquiring actual measurement values of at least one input variable describing a state of said machine tool by means of sensors on said machine tool,
providing at least one compensation parameter to be evaluated by a control device of the machine tool to said control device of the machine tool,
compensating for errors on said machine tool based on the at least one compensation parameter provided to said control device,
wherein the step of providing the at least one compensation parameter further comprises:
providing multiple characteristic diagrams, each of which describes a structural behavior of said machine tool and/or a geometric arrangement of machine parts of said machine tool as a function of the respective input variable,
providing a combined characteristic diagram by superimposing at least two of the multiple provided characteristic diagram, wherein each of the at least two characteristic diagrams used for superimposing describes a different behavior of said machine tool from a group of behaviors, with said group of behaviors comprises a temperature behavior, a static displacement behavior, a dynamic displacement behavior of an individual machine part of said machine tool and a dynamic displacement behavior of a plurality of machine parts of said machine tool, respectively,
providing a global correction model configured to calculate the at least one compensation parameter to be evaluated by said control device of said machine tool based on the provided combined characteristic diagram, the acquired actual measurement values and/or one or more control parameters of said control device,
calculating the at least one compensation parameter using the global correction model based on the provided combined characteristic diagram, the acquired actual measurement values and/or the control parameters,
providing the calculated at least one compensation parameter, which is to be evaluated by said control device to said control device of said machine tool.

2. The method according to claim 1, characterized in that the characteristic diagrams provided each describe a temperature behavior, a static displacement behavior and/or a dynamic displacement behavior of the individual or the plurality of machine parts of said machine tool.

3. The method according to claim 1, wherein the input variables describing the state of said machine tool are at least temperature values and additionally position values and/or acceleration values and/or force values and/or torque values and/or strain values and/or humidity values and/or values measured directly on the workpiece.

4. The method according to claim 1, wherein the input variables of the characteristic diagrams and/or the combined characteristic diagram are in a form of vector variables.

5. The method according to claim 1, wherein the calculation of the at least one compensation parameter and/or the compensation of errors based thereon may be performed at freely selectable time intervals.

6. The method according to claim 1, wherein the characteristic diagrams are each provided based on an acquisition of a plurality of reference measurement values of the input variables and/or by evaluating a computer-implemented simulation model or by externally measuring a workpiece.

7. The method according to claim 1, wherein the characteristic diagrams and/or the combined characteristic diagram are adjusted based on the acquired actual measurement values and/or the control parameters.

8. The method according to claim 7, wherein the adjustment of the characteristic diagrams and/or the combined characteristic diagrams is performed based on the actual measurement values and/or the control parameter using a computer-implemented neural network or another AI algorithm.

9. The method according to claim 8, wherein the adjustment of the characteristic diagrams and/or the combined characteristic diagram comprises:
reading at least part of the currently provided characteristic diagrams and/or part of a currently provided combined characteristic diagram into the neural network or other AI algorithms;
reading the actual measurement values and/or the control parameters into the neural network or other AI algorithms; and
determining an adjusted characteristic diagram and/or an adjusted combined characteristic diagram.

10. The method according to claim 7, wherein the adjustment of the characteristic diagrams and/or the combined characteristic diagram is performed automatically at predetermined time intervals.

11. The method according to claim 7, wherein the at least one compensation parameter is calculated using the global correction model based on the adjusted characteristic diagram or a combined characteristic diagram.

12. The method according to claim 7, wherein the actual measurement values are acquired with the workpiece inserted in said machine tool.

13. The method according to claim 12, wherein the adjustment of the characteristic diagrams and/or the combined characteristic diagram additionally comprises:
acquiring of one or more geometric deviations between target geometries and measured actual geometries of a first workpiece machined by the machine tool,
adjusting the characteristic diagrams and/or the combined characteristic diagram based on the acquired actual measurement values and/or the at least one control parameter and/or the acquired geometric deviation.

14. The method according to claim 13, wherein the actual geometries of the first workpiece are acquired by an optical and/or touching measuring device.

15. The method according to claim 1, wherein the calculation of the at least one compensation parameter using the global correction model is performed by interpolation in the combined characteristic diagram on a basis of the acquired actual measurement values and/or the control parameters.

16. The method according to claim 1, wherein an evaluating device is configured to superimpose the characteristic diagrams in order to form the combined characteristic diagram and/or to provide the global correction model, to receive the acquired actual measurement values and/or the control parameters, to calculate the at least one compensation parameter based on the received actual measurement values and/or the control parameters, and to provide the calculated compensation parameters to the control device of said machine tool.

17. The method according to claim 16, wherein the evaluating device is formed integrally as part of said control device.

18. The method according to claim 15, wherein the characteristic diagram is recalculated in a cloud or on an external computer and the recalculated characteristic diagram is exchanged at the machine control.

19. The method of claim 1, wherein the method is carried out by a control system for compensating for errors on the machine tool, the control system comprising a control device of the machine tool, and one or more sensors attached to the machine tool for acquiring actual management values of one or more input variables describing a state of said machine tool.

* * * * *